Nov. 30, 1937.  A. F. BREITENSTEIN  2,100,376
TAPER THREAD CUTTING TOOL
Filed Oct. 10, 1936  3 Sheets-Sheet 1
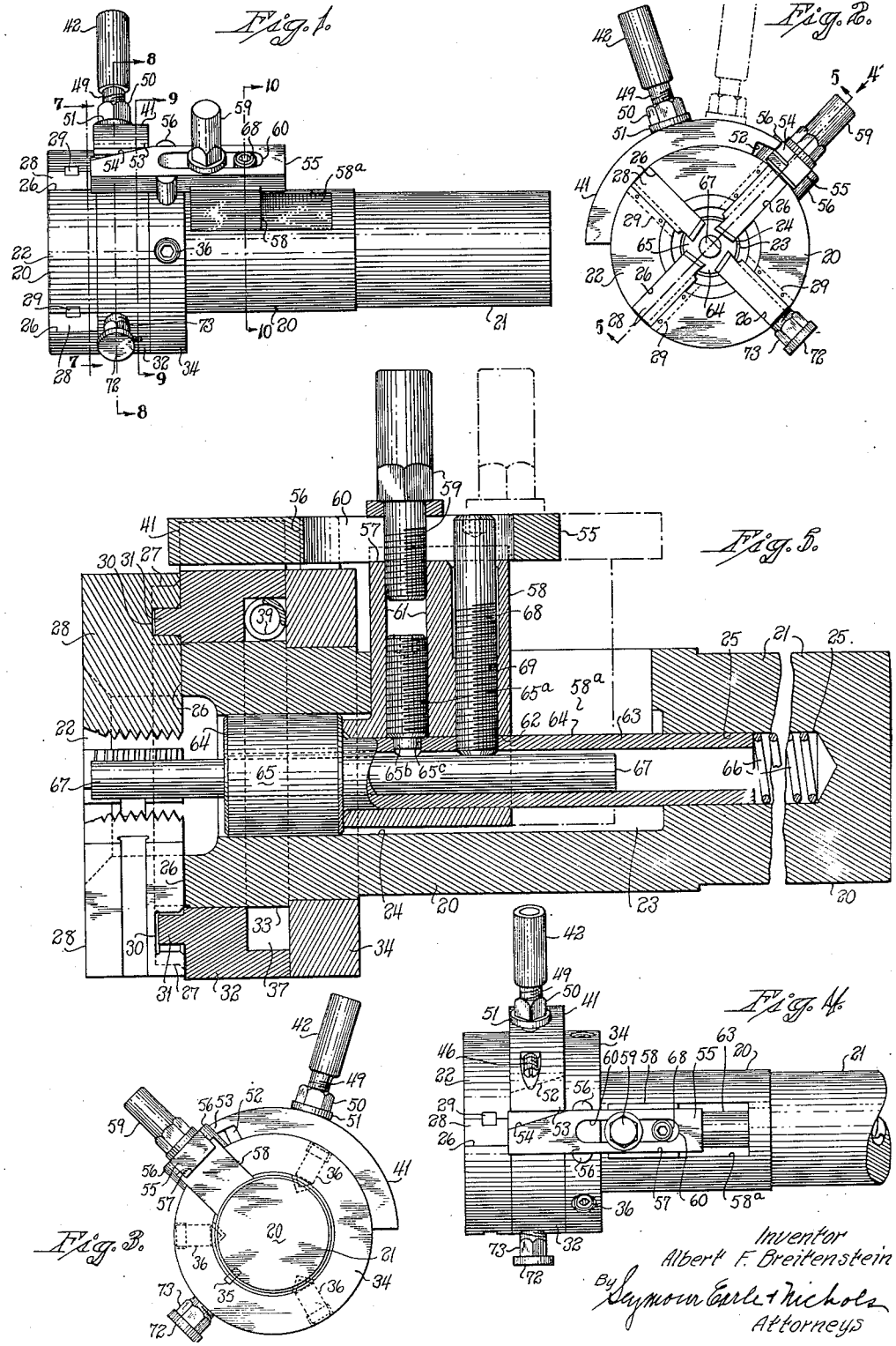
Inventor
Albert F. Breitenstein
By Seymour Earle & Nichols
Attorneys Nov. 30, 1937.   A. F. BREITENSTEIN   2,100,376
TAPER THREAD CUTTING TOOL
Filed Oct. 10, 1936   3 Sheets-Sheet 2
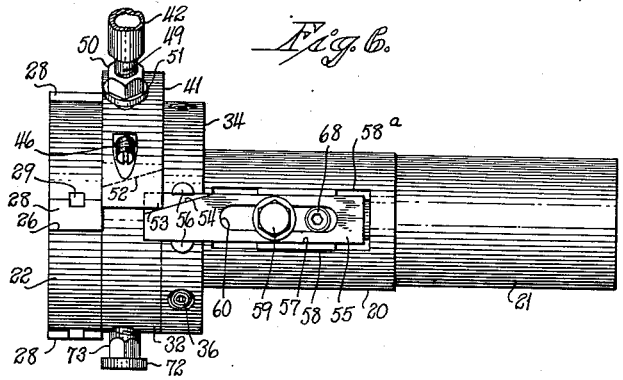
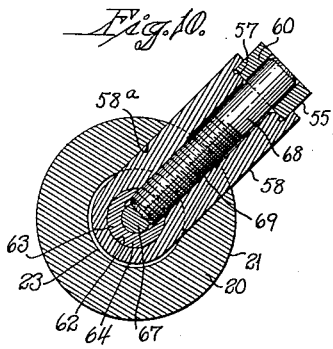
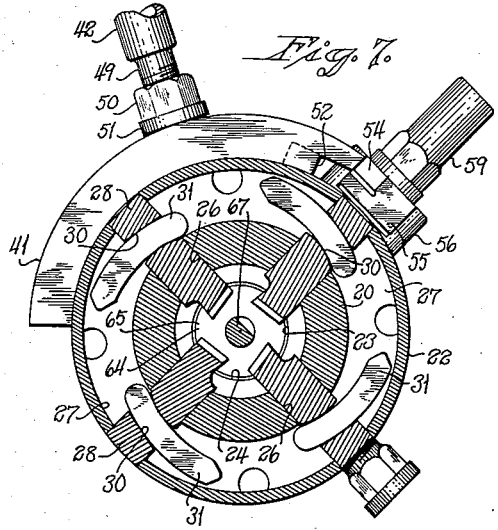
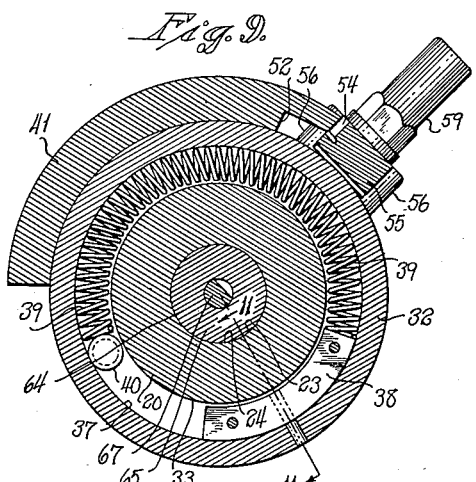
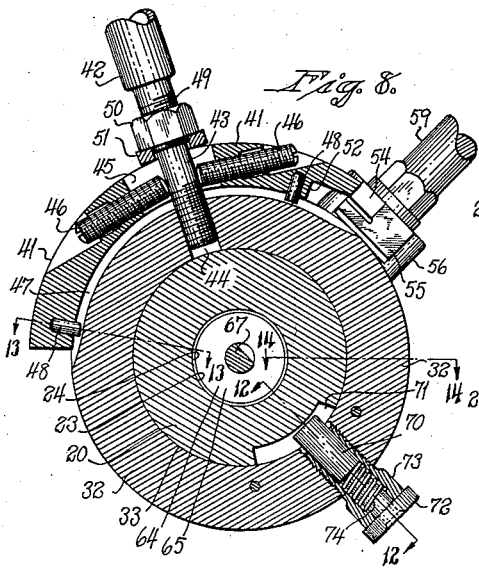
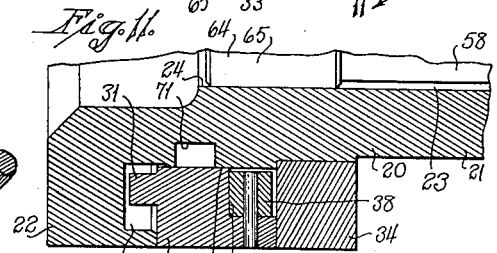
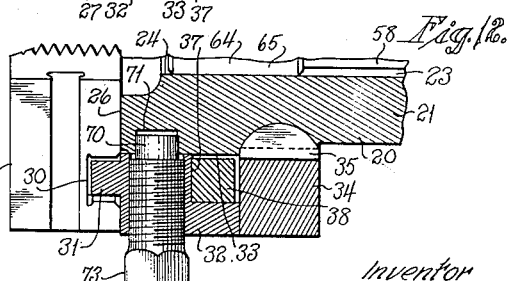
Inventor
Albert F. Breitenstein
By Seymour Earle & Nichols
Attorneys Nov. 30, 1937.  A. F. BREITENSTEIN  2,100,376
TAPER THREAD CUTTING TOOL
Filed Oct. 10, 1936   3 Sheets-Sheet 3
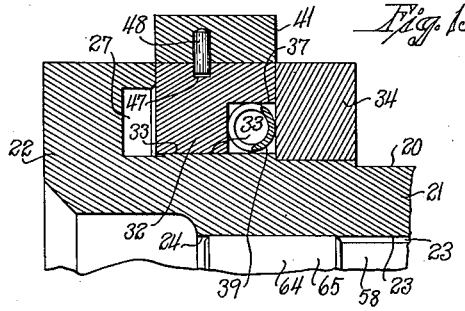
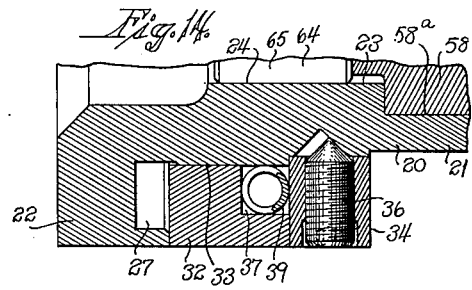
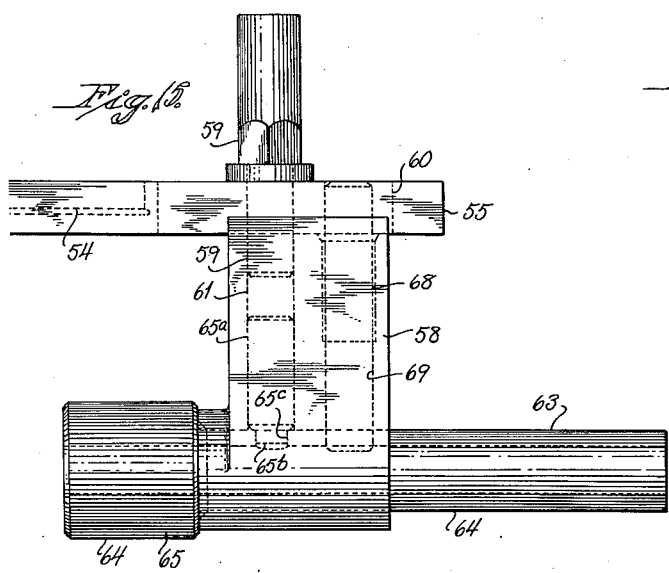
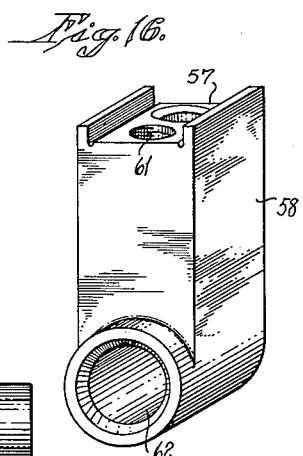
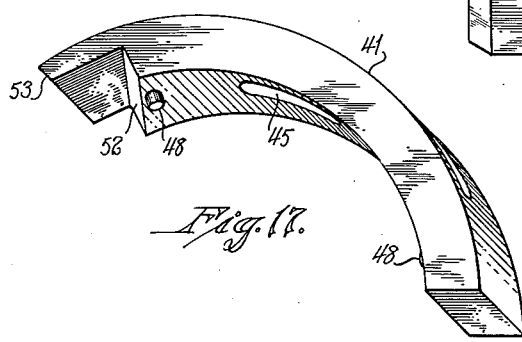
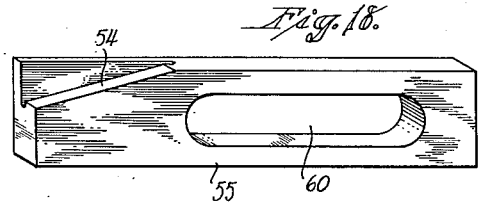
Inventor
Albert F. Breitenstein
By Seymour Earle & Nichols
Attorneys Patented Nov. 30, 1937

2,100,376

UNITED STATES PATENT OFFICE 2,100,376

TAPER-THREAD-CUTTING TOOL

Albert F. Breitenstein, New Haven, Conn., assignor to The Geometric Tool Company, New Haven, Conn., a corporation of Connecticut Application October 10, 1936, Serial No. 104,934

10 Claims. (Cl. 10—120.5)

This invention relates to an improvement in thread-cutting tools, and particularly tools for cutting taper-threads.

Thread-cutting tools of the type referred to as heretofore constructed have been open to the serious objection that the parts of the tool which move relative to each other, in order to govern the taper of the thread being cut, have had an excessive tendency to bind or cramp, thus not only causing stiffness of operation, but also interfering with the accuracy of the threading operation. The binding or cramping action, before referred to, occasions excessive wear upon the parts, which becomes more and more marked as the result of continued use.

One of the objects of the present invention is to provide a superior taper-thread-cutting tool characterized by reliability and smoothness of operation.

A further object is to provide a superior taper-thread-cutting tool having exterior means for controlling the taper of the thread being cut, which latter means is characterized by superior sensitivity and freedom from binding or cramping.

With the above and other objects in view, as will appear to those skilled in the art from the present disclosure, this invention includes all features in the said disclosure which are novel over the prior art and which are not claimed by me in a separate application.

In the accompanying drawings:

Fig. 1 is a view in side elevation of one form which a taper-thread-cutting tool may assume in accordance with the present invention, the parts being shown in the positions which they assume preparatory to the cutting of a taper-thread;

Fig. 2 is a front end view thereof;

Fig. 3 is a rear end view thereof;

Fig. 4 is a view of the tool viewed from the direction of the arrow 4 of Fig. 2;

Fig. 5 is a central longitudinal sectional view taken on the line 5—5 of Fig. 2;

Fig. 6 is a view similar to Fig. 4, but showing the parts in the positions which they assume near the completion of a thread-cutting operation;

Fig. 7 is a transverse sectional view taken on the line 7—7 of Fig. 1;

Fig. 8 is a similar view taken on the line 8—8 of Fig. 1;

Fig. 9 is a transverse sectional view taken on the line 9—9 of Fig. 1;

Fig. 10 is a similar view taken on the line 10—10 of Fig. 1;

Fig. 11 is a broken view in longitudinal section taken on the line 11—11 of Fig. 9;

Fig. 12 is a similar view taken on the line 12—12 of Fig. 8;

Fig. 13 is a broken view in longitudinal section taken on the line 13—13 of Fig. 8;

Fig. 14 is a similar view taken on the line 14—14 of Fig. 8;

Fig. 15 is a view in side elevation of the taper-control unit which reciprocates relative to the body-member;

Fig. 16 is a perspective view of the mounting-post for the taper-control slide;

Fig. 17 is a perspective view of the taper-control segment; and

Fig. 18 is a similar view of the taper-control slide.

The particular self-opening die-head herein chosen for the illustration of the present invention includes a mounting- or body-member, generally designated by the numeral 20, and consisting of a rearwardly-extending shank 21 adapted to be mounted in a turret or other appropriate feature of a machine, and an annular flange-like head-portion 22. The said mounting-member is provided with an axial bore, generally designated by the numeral 23 and comprising a relatively-large forward portion 24 and a relatively-small rear portion 25, both of which portions constitute bearing-portions for the purpose as will hereinafter appear.

The head-portion 22 of the body-member 20 is formed in its forward face with four (more or less) corresponding radial grooves 26 intersecting the outer periphery of the head-portion 22 and the extreme forward end of the axial bore 23. The said grooves also extend from front to rear through the head-portion 22 and are intersected by an annular groove 27 formed in the back-face thereof. Installed in each of the grooves 26 is a radially-movable chaser 28, each of which is maintained in its complementary groove against displacement longitudinally of the die-head by a key 29.

Each chaser 28 is formed in its rear face with a slightly-inclined transverse groove 30 adapted to receive one of four similarly-inclined cam lugs 31 forwardly projecting into the annular groove 27 of the head-portion 22 from an oscillating chaser-operating ring 32. The said ring 32 oscillates upon a cylindrical bearing-surface 33 formed upon the body-member 20 just to the rear of the head-portion 22 thereof. The chaser-operating ring 32 is restrained against forward axial movement by the rear face of the head-portion 22 of the body-member 20 and is held against rearward axial displacement by a retaining-ring 34 mounted upon the said body-member 20 just to the rear of the cylindrical bearing-surface 33 thereon. The said retaining-ring, when in place, forms a unit with the said body-member, but is made separate for the purpose of ease of manufacture and assembly. The said retaining-ring 34 is secured to the body-member 20 by means of a key 35 (Fig. 12) and set-screws 36 (Figs. 3 and 14).

The inner rear corner of the chaser-operating ring 32 is formed with an annular groove 37 in which is rigidly secured an abutment-segment 38, against one edge of which rests a helical chaser-retracting spring 39 which is housed within the groove 37, just referred to. The opposite end of the said spring 39 bears against a stud 40 forwardly projecting from the retaining-ring 34. The said spring 39, as thus arranged, exerts a constant effort to move the chaser-operating ring 32 in a clockwise direction to thus effect the outward movement of the chasers 28.

The chaser-operating ring 32 has secured to its periphery a circumferentially-adjustable taper-control segment 41 through which projects a resetting-handle 42 having a threaded shank 43 extending into a threaded bore 44 formed in the said chaser-operating ring. The shank 43 of the resetting-handle 42 extends through a longitudinal clearance-slot 45 formed in the segment 41 and has bearing against its respective opposite sides adjusting-screws 46—46 mounted in the segment 41, as clearly shown in Fig. 8. The said screws 46—46 provide means whereby the said segment may be adjusted longitudinally in a direction circumferentially of the tool.

Directly beneath the taper-control segment 41, the chaser-operating ring 32 is formed in its periphery with a guide-groove 47 into which project guide-pins 48—48 carried by the segment 41 and serving to hold the latter against displacement longitudinally of the die-head. Mounted upon a threaded portion 49 of the resetting-handle 42 is a clamping-nut 50 acting through a washer 51 to clamp the segment 41 in place upon the periphery of the chaser-operating ring 32.

The taper-control segment 41 has the inner corner of one of its ends cut away as at 52 to provide a cam-nose 53 having sliding engagement with an inclined cam-surface 54 formed upon a taper-control slide or member 55. The said slide 55 extends rearwardly from the segment 41 between the guide-pins 56—56 respectively located on its respective opposite sides and rigidly carried by the retaining-ring 34.

The taper-control slide 55 (which may be replaced by a similar member having a different cam-surface) is rigidly though adjustably seated in a guide-groove 57 formed in the outer end of a post 58 (Figs. 5, 15 and 16), to which latter the said slide is attached by means of a clamping-screw 59 extending through a longitudinal clearance-slot 60 formed in the slide 55 and into the outer portion of a threaded bore 61 formed in the post 58. The said post 58 extends through and laterally bears in a radial slot or passage 58ᵃ formed in the shank of the body-member 20. The inner end of the post 58 is formed with a cylindrical bore 62 extending parallel to its groove 57 and receiving the hollow shank 63 of a reciprocating tubular bearing-member, generally designated by the numeral 64, and including in addition to the said shank 63 a head-portion 65. Located in the inner portion of the threaded bore 61 in the post 58 is a coupling-screw 65ᵃ having a coupling-terminal 65ᵇ which projects into a coupling-bore 65ᶜ in the bearing-member 64.

The head-portion 65 of the bearing-member 64 is adapted to reciprocate in the bearing-portion 24 of the bore 23 in the body-member 20. Similarly, the rear end of the shank 63 of the bearing-member 64 reciprocates in the small-diameter bearing-portion 25 of the bore 23. As shown in Fig. 5, the bearing-member 64, together with the parts carried thereby, is constantly urged forwardly by a helical spring 66 housed in the small-diameter bearing-portion 25 of the bore 23.

Projecting forwardly from and adjustably mounted within the hollow interior of the bearing-member 64 is an actuating-rod 67 which is clamped in any desired position of adjustment relative to the said bearing-member by a locking-screw 68 projecting through the wall of the shank 63 and mounted in a threaded bore 69 in the post 58. The outer end of the said locking-screw 68 projects outwardly into the longitudinal slot 60 in the slide 55 in convenient position for being tightened and loosened by a suitable tool.

For the purpose of releasably limiting the oscillating movement of the chaser-operating ring 32 with respect to the die-head structure, a stop-plunger 70 is carried by the said ring and projects into an arcuate notch 71 in the body-member 20 (Figs. 8 and 12). The stop-plunger 70 is provided with a knurled head 72 and is mounted for reciprocating movement in a bushing 73 threaded into the chaser-operating ring 32. A spring 74 encircling the reduced outer portion of the stop-plunger 70 and located within the bushing 73 serves to maintain the inner end of the said stop-plunger projected into the notch 71 in the body-member 20.

As will be noted by reference to Fig. 15 in particular, the bearing-member 64, the post 58 and the control-slide 55 constitute a taper-control unit having bearing within the die-head structure at relatively-widely-separated points 24 and 25, with the result that when an effort is made to shift the said taper-control unit with respect to the die-head structure, no appreciable cramping action will occur.

With the taper-control slide 55 and the taper-control segment 41 in the relative positions in which they are shown particularly well in Figs. 1 and 4, the chasers 28 will be projected inwardly to substantially the maximum degree preparatory to a threading operation.

With the actuating-rod 67 properly set as the die-head is moved over the work being threaded, the work will, through the said actuating-rod, cause the taper-control unit comprising the parts 55, 58, 64, etc., to move relatively rearwardly with respect to the die-head structure against the tension of the spring 66. In this manner, the cam-surface 54 of the taper-control slide 55 will retire and progressively permit the taper-control segment 41 to turn in a clockwise direction, as shown in Fig. 6, at a rate dependent upon the slope of the cam-surface 54, just referred to. Inasmuch as the taper-control segment 41 forms a rigid feature of the chaser-actuating ring 32, the latter will also turn in a clockwise direction under the urge of the helical spring 39, thus causing the gradual retraction of the chasers 28, and cause the same to produce a taper-thread upon the work. When the forward end of the taper-control slide 55 has moved to the rear of the nose 53 of the taper-control segment 41, the said segment 41, together with the chaser-operating ring 32, will immediately snap in a clockwise direction under the urge of the spring 39 until the stop-plunger 70 strikes one of the end-walls of the notch 71 in the body-member 20.

When the chaser-operating ring 32 has been moved to the limit of its clockwise movement, the chasers 28 will have thereby been retired completely out of engagement with the work, so that the die-head structure may be axially retired with respect to the said work, or the work may be axially retired with respect to the die-head structure.

The taper-control unit comprising the parts 55, 58, 64 may be moved rearwardly relative to the die-head structure by an external abutment engaging directly with the taper-control slide 55 rather than having the said taper-control unit move rearwardly by means of the work acting through the actuating-rod 67.

After the die-head structure and the work have been separated, the die-head may be reset preparatory to another cutting operation, by swinging the resetting-handle 42 from the position in which it is shown by broken lines in Fig. 2 back to the position in which it is shown in full lines in the same figure. The movement of the resetting-handle, just referred to, will move the chasers 28 inwardly and will permit the spring 66 within the die-head to move the taper-control unit forwardly until the taper-control slide 55 reassumes the position in which it is particularly well shown in Figs. 1 and 4.

The die-head is now reset in readiness for repeating the thread-cutting cycle above described.

By providing a rigid taper-control unit which has bearing at widely-separated points within the interior of the die-head structure, the cramping incident to prior types of taper-thread-cutting tools is substantially obviated.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. In a taper-thread-cutting tool, the combination with a body-member having two spaced-apart bearing-surfaces within its interior and a passage leading laterally therefrom; of a plurality of advanceable and retractable taper-thread-cutting chasers carried by the said body-member; an oscillating chaser-operating unit operatively associated with the said chasers to move the same with reference to an article being threaded; and a taper-control unit effecting the progressive turning movement of the said chaser-operating unit and including a bearing-member having a relatively-large and a relatively-small bearing-portion respectively bearing in the spaced-apart bearing-surfaces within the said body-member at points more widely separated than the largest diameter of the larger of the two bearing-portions of the said bearing-member, the said taper-control unit also comprising a post-like portion member rigidly carried and guided directly by and extending outwardly from the said bearing-member through the passage leading from the interior of the said body-member at a point intermediate the respective opposite ends thereof, and a member carried by the said rigid post-like member and having cam-like engagement with a portion of the said chaser-operating unit and effecting the oscillation thereof as the taper-control unit is moved axially of the tool structure.

2. In a taper-thread-cutting tool, the combination with a body-member having bearing-surfaces within its interior and a passage leading laterally therefrom; of a plurality of advanceable and retractable taper-thread-cutting chasers carried by the said body-member; an oscillating chaser-operating unit operatively associated with the said chasers to move the same with reference to an article being threaded; a taper-control unit effecting the progressive turning movement of the said chaser-operating unit and including a tubular bearing-member bearing in the bearing-surfaces within the said body-member at points more widely separated than the largest diameter of the said bearing-portion, the said taper-control unit also comprising a rigid post-like member rigidly carried and guided directly by and extending outwardly from the said tubular bearing-member through the passage leading from the interior of the said body-member, and a member carried by the said rigid post-like member and having cam-like engagement with a portion of the said chaser-operating unit and effecting the oscillation thereof as the taper-control unit is moved axially of the tool structure, and an actuating-rod adjustably mounted within the interior of the tubular bearing-member of the said taper-control unit in position to be engaged by the article being threaded.

3. In a taper-thread-cutting tool, the combination with a body-member having bearing-surfaces within its interior and a passage leading laterally therefrom; of a plurality of advanceable and retractable taper-thread-cutting chasers carried by the said body-member; an oscillating chaser-operating ring operatively associated with the said chasers to move the same with reference to an article being threaded; a taper-control member carried by the said chaser-operating ring and adjustable circumferentially with respect thereto; and a taper-control unit effecting the progressive turning movement of the said chaser-operating ring and including a bearing-member bearing in the bearing-surfaces within the said body-member at points more widely separated than the largest diameter of the said bearing-member, the said taper-control unit also including a rigid post-like member rigidly carried and directly guided by and extending outwardly from the said bearing-member through the passage leading from the interior of the said body-member, and a member carried by the said rigid post-like member and having cam-like engagement with the taper-control member carried by the said chaser-operating ring.

4. In a taper-thread-cutting tool, the combination with a body-member having bearing-surfaces within its interior and a passage leading laterally therefrom; of a plurality of advanceable and retractable taper-thread-cutting chasers carried by the said body-member; an oscillating chaser-operating unit operatively associated with the said chasers to move the same with reference to an article being threaded; and a taper-control unit effecting the progressive turning movement of the said chaser-operating unit and including a bearing-member bearing in the bearing-surfaces within the said body-member at points more widely separated than the largest diameter of the said bearing-member, the said taper-control unit also including a rigid post-like member rigidly carried and directly guided by and extending outwardly from the said bearing-member through the passage leading from the interior of the said body-member, and a member clamped to the said rigid post-like member with capacity for adjustment longitudinally of the tool structure and having cam-like engagement with a portion of the said chaser-operating unit.

5. In a taper-thread-cutting tool, the combination with a body-member having bearing-surfaces within its interior and a passage leading laterally therefrom; of a plurality of advanceable and retractable taper-thread-cutting chasers carried by the said body-member; an oscillating chaser-operating ring operatively associated with the said chasers to move the same with reference to an article being threaded; a taper-control segment carried by the said chaser-operating ring and adjustable circumferentially with respect thereto; and a taper-control unit effecting the progressive turning movement of the said chaser-operating ring and including a bearing-member bearing in the bearing-surfaces within the said body-member at points more widely separated than the largest diameter of the said bearing-portion, the said taper-control unit also including a rigid post-like member rigidly carried and directly guided by and extending outwardly from the said bearing-member through the passage leading from the interior of the said body-member, and a member carried by the said rigid post-like member and having cam-like engagement with the taper-control segment carried by the said chaser-operating ring.

6. In a taper-thread-cutting tool, the combination with a body-member having bearing-surfaces within its interior and a passage leading laterally therefrom; of a plurality of advanceable and retractable taper-thread-cutting chasers carried by the said body-member; an oscillating chaser-operating ring operatively associated with the said chasers to move the same with reference to an article being threaded; a taper-control segment carried by the said chaser-operating ring and adjustable circumferentially with respect thereto; and a taper-control unit effecting the progressive turning movement of the said chaser-operating ring and including a bearing-member bearing in the bearing-surfaces within the said body-member at points more widely separated than the largest diameter of the said bearing-member, the said taper-control unit also including a rigid post-like member rigidly carried and directly guided by and extending outwardly from the said bearing-member through the passage leading from the interior of the said body-member, and a member clamped to the said rigid post-like member with capacity for adjustment longitudinally of the tool structure and having cam-like engagement with the taper-control segment carried by the said chaser-operating ring.

7. In a taper-thread-cutting tool, the combination with a body-member having a hollow interior and a passage leading laterally therefrom; of a plurality of advanceable and retractable taper-thread-cutting chasers carried by the said body-member; a chaser-operating unit operatively associated with the said chasers to move the same with reference to an article being threaded; and a taper-control unit effecting the movement of the said chaser-operating unit and including a bearing-member slidable within the interior of the said body-member, a post-like member having a tubular inner portion through which the said bearing-member passes and by which it is directly supported, and a taper-control member secured to the outer portion of the said post-like member with respect to which it is longitudinally adjustable, the said taper-control member having cam-like engagement with a portion of the said chaser-operating unit.

8. In a taper-thread-cutting tool, the combination with a body-member having a hollow interior and a passage leading laterally therefrom; of a plurality of advanceable and retractable taper-thread-cutting chasers carried by the said body-member; a chaser-operating unit operatively associated with the said chasers to move the same with reference to an article being threaded; and a taper-control unit effecting the movement of the said chaser-operating unit and including a bearing-member slidable within the interior of the said body-member, a post-like member having a tubular inner portion through which the said bearing-member passes and by which it is directly supported and formed in its outer portion with a guide-groove, and a taper-control member mounted in the guide-groove of the said post-like member with respect to which latter it is adjustable longitudinally of the tool, the said taper-control member having cam-like engagement with a portion of the said chaser-operating unit.

9. In a taper-thread-cutting tool, the combination with a body-member having a hollow interior and a passage leading laterally therefrom; of a plurality of advanceable and retractable taper-thread-cutting chasers carried by the said body-member; an oscillating chaser-operating ring operatively associated with the said chasers to move the same with reference to an article being threaded; a taper-control segment carried by the said chaser-operating ring and adjustable circumferentially thereof; and a taper-control unit effecting the movement of the said chaser-operating unit and including a bearing-member slidable within the interior of the said body-member, a post-like member having an inner portion rigidly mounted directly upon the said bearing-member and through which the said bearing-member passes, and a taper-control member secured to the outer portion of the said post-like member with respect to which it is longitudinally adjustable, the said taper-control member having cam-like engagement with a portion of the said chaser-operating ring.

10. In a taper-thread-cutting tool, the combination with a body-member having a hollow interior and a passage leading laterally therefrom; of a plurality of advanceable and retractable taper-thread-cutting chasers carried by the said body-member; an oscillating chaser-operating ring operatively associated with the said chasers to move the same with reference to an article being threaded; a taper-control segment carried by the said chaser-operating ring and adjustable circumferentially thereof; and a taper-control unit effecting the movement of the said chaser-operating unit and including a bearing-member slidable within the interior of the said body-member, a post-like projection having an inner portion rigidly mounted directly upon the said bearing-member and through which the said bearing-member passes and formed in its outer portion with a guide-groove, and a taper-control member mounted in the guide-groove of the said post-like member with respect to which latter it is adjustable longitudinally of the tool, the said taper-control member having cam-like engagement with the said taper-control segment.

ALBERT F. BREITENSTEIN.